(No Model.)

F. W. KENDALL.
LIQUID DISTRIBUTER.

No. 422,799. Patented Mar. 4, 1890.

Witnesses.
E. C. Duffy
Chas. M. Werle

Inventor:
Festus W. Kendall
per C. E. Duffy
Attorney

UNITED STATES PATENT OFFICE.

FESTUS WILLIAM KENDALL, OF SWARTWOOD, NEW YORK.

LIQUID-DISTRIBUTER.

SPECIFICATION forming part of Letters Patent No. 422,799, dated March 4, 1890.

Application filed June 20, 1889. Serial No. 315,011. (No model.)

*To all whom it may concern:*

Be it known that I, FESTUS WILLIAM KENDALL, of Swartwood, in the county of Chemung and State of New York, have invented certain new and useful Improvements in Liquid-Distributers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in liquid or poison distributers.

The object of my invention is to provide an improved liquid spraying or distributing machine mounted on wheels, which is exceedingly cheap, simple, and light in construction, complete in all its parts, and sure and effective in operation, and so constructed that either high or low vines or wide or narrow rows can be sprinkled with poison or liquid and both sides of the plants or vines in the direction of the rows will be sprinkled, and the adjustment of the parts can be easily controlled by the operator or driver, and also the flow of liquid stopped or started. These objects are accomplished by and my invention consists in certain novel features of construction and combinations of parts, more fully described hereinafter, and particularly pointed out in the claims.

Figure 1:
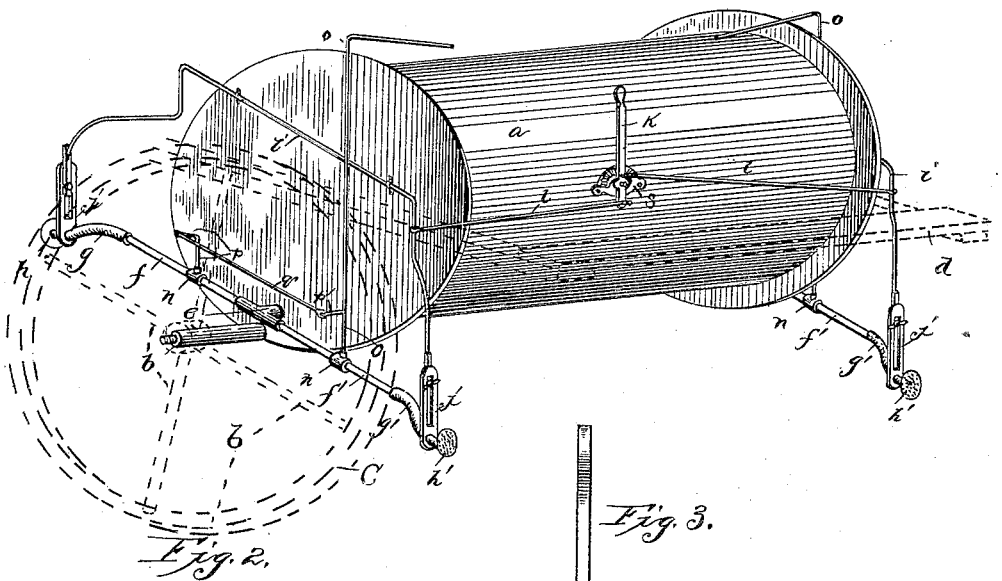
Figure 2:

Referring to the accompanying drawings, Figure 1 is a perspective view of supply-tank of the machine, certain parts being broken away, as shown in dotted lines, to clearly show the construction of the present invention. Figs. 2 and 3 are details.

In the drawings, the reference-letter $a$ indicates the cylindrical supply-tank of the machine, horizontally mounted and supported by two wheels, one of which C is shown in dotted lines. This tank is provided with an opening, through which the tank can be filled with liquid poison, which is usually composed of a mixture of Paris green and water, the mixture being constantly agitated by a series of agitators. (Not shown.)

The machine is provided with thills (not shown) or other means by which it can be readily drawn, and also a seat $d$ for the driver, located to the rear of the tank.

Each head of the tank is provided with a discharge-pipe $e$, extending outwardly a short distance from the lower portions of the heads, and preferably provided on their ends with T-couplings, and from each T-coupling a short section of rigid pipe $f$ extends forwardly, and also a corresponding section of pipe $f'$ rearwardly, as shown. To the front rigid pipe $f$ a short section of flexible pipe $g$ is attached, and is provided with the front spray or rose-head $h$, and the rearwardly-extending rigid pipe $f'$ is also provided with a section of flexible pipe $g'$, having the rear spray $h'$.

The front and rear spray-heads at each end of the tank are held at the desired position and adjustment by supporting-yokes $i$, each yoke having a straight portion extending across its head of the tank and loosely secured thereto, as by staples, to allow the yoke to be turned or partially rotated; and from the opposite ends of this straight portion the yoke extends downwardly to the front and rear spray-heads, and is directly secured to and supports said heads by means of the stirrups $j\,j$, each at its lower end, provided with a transverse aperture through which the neck of its spray-head passes, and the upper portion of each stirrup being longitudinally slotted, whereby each stirrup can be clamped to its respective arm of the swinging yoke to allow vertical adjustment by a headed bolt passed through said slot and secured to the yoke-arm.

The two yokes at the opposite ends of the tank are swung and held to hold the spray-heads in the desired lateral adjustment by means of a vertical lever $k$, pivoted at the rear side of the tanks about midway between its ends, and having its upper handle end located within convenient reach from the driver's seat and its lower end extended below the pivotal point. The portion of the lever below the pivotal point thereof is connected with the rear downwardly-extending arm of the swinging yoke at one end of the tank by means of a rod $l$, and the corresponding arm of the yoke at the opposite end of the tank is connected with the portion of said lever above its pivotal point by a similar rod $l'$, so that when the handle of the lever is pushed in one direction both yokes and the four sprays will be simultaneously pushed outwardly from the heads of the tank, and when the lever is swung in the opposite direction the yokes and spray-heads will be carried simultaneously in toward the ends of the tank, and the lever and consequently the yokes and spray-heads are held in the desired adjustment by means of a pawl carried by the lever and engaging the ratchet-notches of a bracket or ratchet head block s, secured to the tank and in which said lever is pivoted.

The ratchet-block s is rigidly secured to the rear side of the tank, and consists of a casting having a semicircular series of ratchet recesses or openings in the upper portion thereof. The lever k is pivoted a distance above its lower end to said block by means of a headed bolt or pivot t, passing loosely through and projecting beyond the outer side of the lever, and a stiff coiled spring t' embraces the bolt and is interposed between the head of the same and yieldingly holds the lever against the ratchet and a lug u, formed on the lever in one of the ratchet-notches of the block, whereby the lever is rigidly held in the desired adjustment; and when it is desired to swing the same in either direction the handle end is drawn outwardly against the tension of the spring, thereby releasing said lug from the ratchet-notch, and when the lever is released it will immediately spring to its normal position.

From the drawings and the foregoing it is evident that the spray-heads can be easily and quickly raised and lowered for high or low vines by means of the slotted stirrups and that they can be adjusted laterally for rows far apart or near together by the lever and yoke, and as the machine is provided with spray-heads for each row discharging in opposite directions as the machine moves forward the front spray will wash one side of the vines and the rear spray the opposite side.

The forwardly-extending and the rearwardly-extending rigid pipes at each end of the tank are each provided with cut-off valves or gates n, provided with vertical valve-stems. The valve stems or rods o o for each of the valves of the rear sprays are continued up and provided on their upper ends with handles within easy reach from the driver's seat, and the stems of the valves for the forward sprays are provided with lateral arms p, connected with corresponding lateral arms p' from the rods o by means of connecting-rods q, so that when the driver turns a rod o both the valves for the front and rear spray at that end will be simultaneously either closed or opened.

It is evident that various slight changes or modifications might be made in the form and arrangement of the parts described without departing from the spirit and scope of my invention; hence I do not wish to limit myself to the precise construction herein set forth.

What I claim is—

1. In a liquid-distributer, the combination, with the tank and the front and rear discharge pipes having flexible sections, of swinging yokes pivoted to the ends of the tank and having front and rear depending arms supporting the discharge ends of said pipes, and a lever connected with both yokes and by which the yokes are moved and held in the desired adjustment, substantially as described.

2. In a liquid-distributer, the combination of the tank and discharge-pipes from the same having flexible sections with swinging yokes pivoted to the ends of the tank and having depending ends, stirrups supporting the discharge ends of the pipes and secured to said ends of the yokes in vertical adjustment, and a lever pivoted on the tank and connected with said yokes to simultaneously swing the same, and provided with means whereby the lever can be held in position and thereby hold the discharge ends of the pipes in the desired adjustment, substantially as described.

3. The combination of the block having a series of ratchet-notches, the lever pivoted thereto, a headed bolt secured to the block and extending loosely through and beyond the lever, and a coiled spring embracing the bolt and interposed between said lever and the head of the bolt, said lever being provided with a lug to fit in said notches and hold the lever in the desired position, substantially as described.

4. In a liquid-distributer, the combination of the supply-tank, discharge-pipes extending from the opposite ends of the same, each discharge-pipe having a forwardly and a rearwardly extending rigid branch pipe, front and rear flexible pipe-sections carried by said branches and provided with the front and rear discharge-mouths, adjustable supports for the discharge-mouths to adjust the same vertically or laterally, and a single lever connected with said supports and by which the discharge-mouths are simultaneously adjusted and held, substantially as described.

5. In a liquid-distributer, the combination of the tank, rigid pipe-sctions extending out from each end of the same and each provided with rigid forwardly and rearwardly extending branches having flexible sections carrying the front and rear discharge-heads, laterally-swinging supports at the ends of the tank carrying said discharge-mouths and by which the same are laterally adjusted, and means whereby said supports can be swung and held in the desired adjustment, substantially as described.

6. In a liquid-distributer, the combination of the mounted supply-tank, oppositely-extending discharge-pipes from said tank provided with flexible sections carrying the discharge-mouths, a pair of separate laterally-swinging supports pivoted at their upper ends and at their lower ends supporting the opposite discharge-mouths, a single lever connected with both of said supports to simultaneously swing the same, and means to hold the supports in the desired adjustment, substantially as described.

7. In a liquid-distributer, the combination of the horizontal mounted tank, discharge-pipes extending in opposite directions from the ends of said tank, each pipe being provided with a forwardly and a rearwardly extending branch provided with discharge-mouths to wash both sides of the plants in the direction of motion, a seat at the rear of said tank, cut-off valves in said forwardly and rearwardly extending branches at both ends of the tank provided with upwardly-extending stems having lateral arms, and rigid rods loosely connecting the pair of lateral arms at each end of the tank, the rear valve-stems at each end being extended upwardly and provided with handles within convenient reach from the driver's seat, so that the valves on either side can be simultaneously operated, substantially as described.

In testimony that I claim the foregoing as my own I affix my signature in presence of two witnesses.

FESTUS WILLIAM KENDALL.

Witnesses:
ELI ADAMS,
W. R. VAN HORN.